United States Patent
Eykholt

(10) Patent No.: US 8,307,341 B2
(45) Date of Patent: Nov. 6, 2012

(54) GENERATING CUSTOMIZED DOCUMENTATION FOR A SOFTWARE PRODUCT

(75) Inventor: Daniel C. Eykholt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 11/740,011

(22) Filed: Apr. 25, 2007

(65) Prior Publication Data

US 2008/0271012 A1 Oct. 30, 2008

(51) Int. Cl.
*G06F 9/45* (2006.01)

(52) U.S. Cl. .......................... 717/123; 717/121; 717/174

(58) Field of Classification Search .......... 717/120–124, 717/174–175; 707/695
See application file for complete search history.

(56) References Cited

U.S. PATENT DOCUMENTS

| | | | | |
|---|---|---|---|---|
| 4,558,413 A * | 12/1985 | Schmidt et al. | | 717/170 |
| 5,870,611 A * | 2/1999 | London Shrader et al. | | 717/175 |
| 5,999,908 A | 12/1999 | Abelow | | |
| 6,282,711 B1 * | 8/2001 | Halpern et al. | | 717/175 |
| 6,401,239 B1 * | 6/2002 | Miron | | 717/173 |
| 6,467,080 B1 * | 10/2002 | Devine et al. | | 717/123 |
| 6,542,897 B2 | 4/2003 | Lee | | |
| 6,553,563 B2 | 4/2003 | Ambrose et al. | | |
| 6,662,357 B1 * | 12/2003 | Bowman-Amuah | | 717/120 |
| 6,779,178 B1 * | 8/2004 | Lloyd et al. | | 717/174 |
| 6,907,597 B1 * | 6/2005 | Mamona et al. | | 717/121 |
| 6,925,634 B2 * | 8/2005 | Hunter et al. | | 717/124 |
| 6,951,010 B2 * | 9/2005 | Sasaki | | 717/123 |
| 7,013,290 B2 | 3/2006 | Ananian | | |
| 7,055,149 B2 * | 5/2006 | Birkholz et al. | | 717/172 |
| 7,146,608 B1 * | 12/2006 | Newman et al. | | 717/168 |
| 7,236,966 B1 * | 6/2007 | Jackson et al. | | 1/1 |
| 7,260,818 B1 * | 8/2007 | Iterum et al. | | 717/170 |
| 7,284,243 B2 * | 10/2007 | Burgess | | 717/175 |
| 7,448,034 B2 * | 11/2008 | Anderson et al. | | 717/176 |
| 7,451,441 B2 * | 11/2008 | Carter et al. | | 717/174 |
| 7,458,073 B1 * | 11/2008 | Darling et al. | | 717/168 |

(Continued)

FOREIGN PATENT DOCUMENTS

WO WO2006072677 7/2006

OTHER PUBLICATIONS

Rabiser et al, "Three level customization of software products using a product line approach", IEEE, pp. 1-10, 2009.*

(Continued)

*Primary Examiner* — Anil Khatri
(74) *Attorney, Agent, or Firm* — Janaki K. Davda; Konrad Raynes & Victor LLP

(57) ABSTRACT

A system and method for creating customized documentation is disclosed. The method comprises storing one or more documents such that each of the one or more documents corresponds to one of a plurality of versions of a software product. The version of the software product which is installed in an installation environment is detected. The configuration of the installation environment is also detected. At least one document from the one or more documents that corresponds to the version of the software product installed in the installation environment is selected. A subset of the selected document that includes the version of the software product installed in the installation environment and the configuration of the installation environment is then determined. A customized document is composed, based on one or more subsets of the selected document.

26 Claims, 6 Drawing Sheets

U.S. PATENT DOCUMENTS

| | | | |
|---|---|---|---|
| 7,536,687 B1 * | 5/2009 | Myers | 717/174 |
| 7,543,269 B2 * | 6/2009 | Krueger et al. | 717/107 |
| 7,568,184 B1 * | 7/2009 | Roth | 717/123 |
| 7,624,377 B2 * | 11/2009 | Wu | 717/121 |
| 7,650,344 B2 * | 1/2010 | Snyder et al. | 707/999.1 |
| 7,730,480 B2 * | 6/2010 | Isaacson | 717/174 |
| 7,735,080 B2 * | 6/2010 | Barturen et al. | 717/177 |
| 7,752,158 B2 * | 7/2010 | Wookey | 706/61 |
| 7,761,851 B2 * | 7/2010 | Bailey et al. | 717/121 |
| 7,797,285 B1 * | 9/2010 | Rivera et al. | 707/678 |
| 7,802,246 B1 * | 9/2010 | Kennedy et al. | 717/173 |
| 7,886,272 B1 * | 2/2011 | Episkopos et al. | 717/124 |
| 7,945,898 B1 * | 5/2011 | Episkopos et al. | 717/124 |
| 8,037,453 B1 * | 10/2011 | Zawadzki | 717/123 |
| 8,146,076 B1 * | 3/2012 | Shumway et al. | 717/174 |

OTHER PUBLICATIONS

White et al, "Automated reasoning for multi step features model configuration problems", ACM pp. 11-20, 2009.*

Anastasopoulos, "Increasing efficieny and effectiveness of software product line evolution an infrastructure on top of configuration management", ACM IWPSE, pp. 47-56, 2009.*

Sharp et al, "A theoretical framework of component based software development phases", ACM—The Data Base for Advances in Infor. Sys. vol. 41, No. 1, pp. 56-75, 2010.*

Chun, H.C.; PDCS: a product definition and customization system for product concept development; AN-8621961; 2005.

Rossi, A.; DEC's All-in-1: evolving integration; AN-2475164; 1985.

Conwell, CL. et al.; Capability Maturity Models Support of Modeling and Simulation Verification, Validation, and Accreditation; Proceedings of the 2000 Winter Simulation Conference; 2000; p. 819-828.

Suardi, L.; How to Manage Your Software Product Life Cycle with Maui; Communications of the ACM Mar. 2004/vol. 47, No. 3, p. 89-94.

* cited by examiner

GENERATING CUSTOMIZED DOCUMENTATION FOR A SOFTWARE PRODUCT

BACKGROUND

1. Field

This disclosure relates to providing documentation customized to the installed configuration of a customer's software product.

2. General Background

Documentation for software products is generally not updated after a major release. For example, a user manual is usually created and released with the initial release of the software product, but not updated with each subsequent fix or software release/update. New releases introduce new features and architectural changes that are often incomplete. Further, the documentation is often incorrect and incomplete. Accordingly, programmers tend to focus on resolving defects in the code rather than revising the corresponding product manual. Even in the case where manuals are updated to accommodate changes or note a common problem and work around, the work around may no longer be relevant in a version where the problem has been corrected.

Customers are often left to rely upon a customer support team's knowledge of known defects and/or fixes, which may or may not be documented. Customer support attempts to solve these problems outside of the product reference documentation stream by creating documents such as technotes, white papers, and/or training materials. However, these documents are also not maintained as product changes are made, and are often lost as the product nears the end of its life.

The customer and vendor can be left in a very costly fix cycle when something goes wrong late in the implementation life. Both vendors and customers experience attrition and incur losses when having to train new personnel. It may take a long time for new personnel to learn old tips and tricks that former experts once held.

Support documents may be available to the customer on a website, or through a help application. However, multiple sources provide similar topic documentation, such as incident reports, duplicate defect reports, technotes, training materials, web and online help. When a customer has a question or problem, a correct answer requires either navigation through webpages, technotes, white papers, or released documentation, or reporting of the problem to customer support. Customers may not be running the current release of the software product and the search may require very specific version and configuration information for resolution.

Additional problems are caused by lack of a single up to date source of documentation. For example, multiple customers report the same defect because documentation is incomplete. Multiple information sources create stale and wrong information, which lead to confusion.

SUMMARY

In one aspect, a method of creating customized documentation for a software product is disclosed. The method comprises detecting which one of a plurality of versions of the software product is installed in an installation environment. The configuration of the installation environment is also detected. At least one document from the one or more documents that corresponds to the version of the software product installed in the installation environment is selected. A subset of the selected document that includes the version of the software product installed in the installation environment and the configuration of the installation environment is then determined. A customized document is composed, based on one or more subsets of the selected document.

In one aspect, the documents include support documentation on the software product, such as a product manual. The documents may be organized corresponding to version by being stored in a version control system.

The configuration may be detected automatically by a discovery application, or instead by receiving a selection from a user through one or more selection menus.

The configuration of the installation environment includes, for example, an operating system associated with the installation environment, one or more hardware devices associated with the installation environment, or one or more applications associated within the installation environment.

In one aspect, the customized document is composed in response to a report by a customer of an issue with the software product. In one aspect, the configuration is saved, and the customized document can be automatically updated based on the saved configuration.

Furthermore, in another aspect, a potential deficiency in the customized document is identified if the issue reported by the customer is not addressed by the customized document. A corresponding deficiency in the subset of the selected document from which the customized document was composed is then identified. In such an aspect, the selected document is revised to address the issue with the software product. A determination may be made that there is a deficiency in the customized document by monitoring a counter, the counter having been increased for each subsequent report of the same issue.

In another aspect, a system for generating customized documentation is disclosed. The system comprises a document repository for storing a plurality of documents. Each of the plurality of documents corresponds to one of a plurality of versions of a software product. A discovery application is configured to detect which one of the plurality of versions of the software product is installed in an installation environment. The discovery application is also configured to detect a configuration of the installation environment. A document selection module is configured to select a document from the one or more documents that corresponds to the version of the software product installed in the installation environment. The document selection module further selects one or more subsets of the document that corresponds to the configuration of the installation environment. A document generation module is configured to compose a customized document based on the one or more subsets of the document selected.

According to another aspect of the present disclosure, there is also provided a computer executable program for executing steps of the above methods, a machine readable storage medium with codes of the computer executable program stored thereon, and a computer program product with codes of the computer program encoded thereon.

The above and other features and advantages of the present disclosure will become more apparent from the following detailed description of preferred embodiments of the present disclosure taken in conjunction with the accompanying drawings.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

A system and method of generating customized documentation for a specific version and configuration of a software product is disclosed. In another aspect, a customer support system and method for responding to issues reported by a customer by identifying a potential defect in the software product documentation is disclosed. The system and method provide clear problem documentation, which extends throughout a software product's life cycle (identification, cause, work around, and correction). Furthermore, the system and method provide a single source of information so that a customer has answers customized to his or her specific environment.

Figure 1:
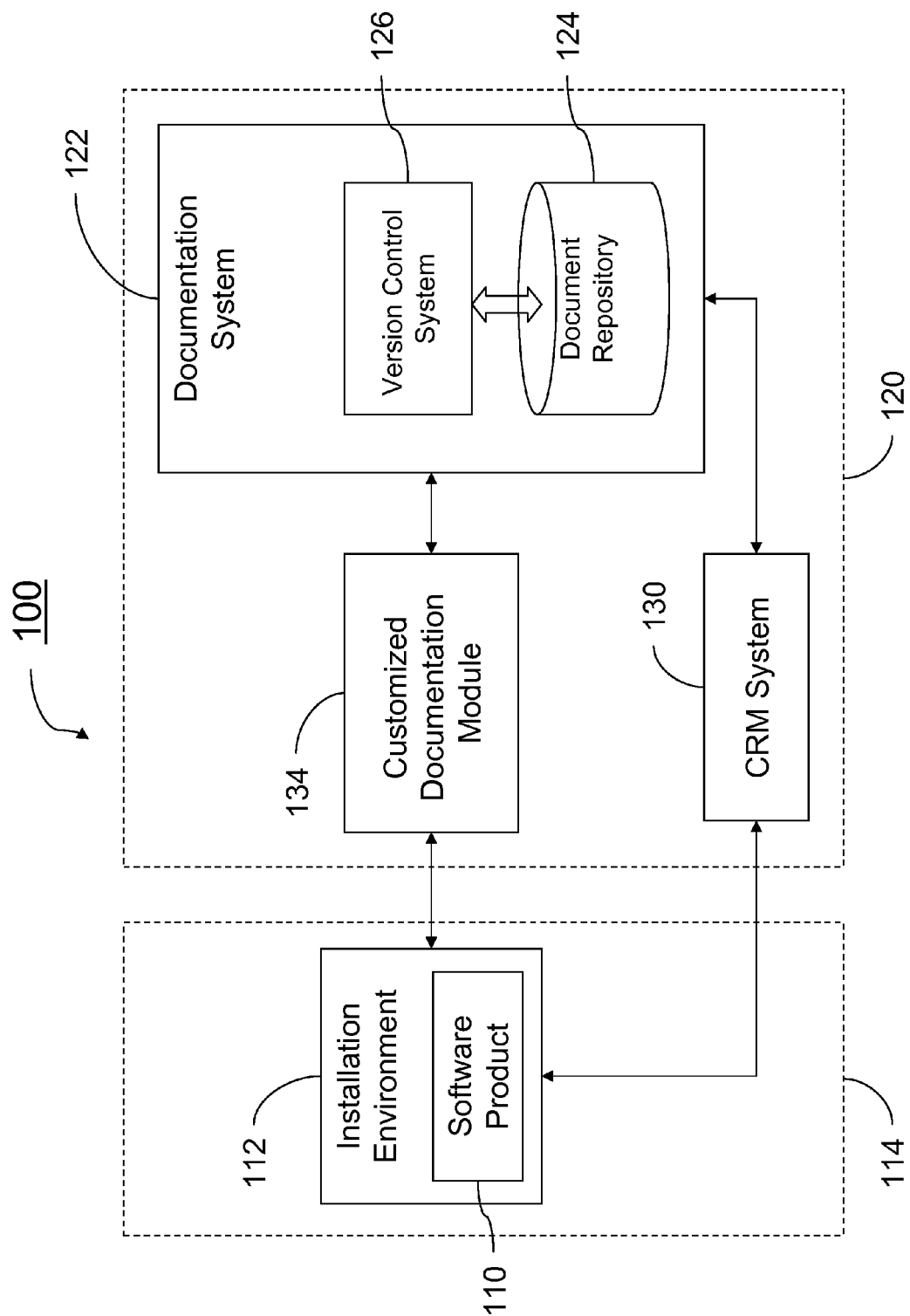
FIG. 1 is a block diagram of a system for generating customized documentation in accordance with one aspect of the disclosure.

FIG. 1 illustrates a block diagram of a system 100 in accordance with one aspect of the present disclosure. A software product 110 is installed within an installation environment 112. The software product may be any type of software product, and installed in any type of installation environment. The installation environment refers to both the physical environment (such as hardware) and the non-physical environment (software, operating system, network configuration) where the software product is installed. The software product 110 is generally installed or maintained by a customer 114. Software product 110 may have a plurality of different versions, any one of which may be installed in the installation environment. Support for the software product 110 is provided by a vendor 120, usually the same as the developer for the software product. In this example, a documentation system 122 is maintained by the vendor 120, however the documentation system may be maintained anywhere. The documentation system 122 comprises a plurality of documents related to software product 110. Documents are stored in a document repository 124. The document repository may be a database, or any other data storage system. In one aspect, the documents are stored in a single centralized location. In another aspect, the documents may be stored in a plurality of different locations.

The documents may come from a plurality of different sources and be of a plurality of different types. For example, one type of document may be the original product manual. Documents may further comprise release notes pertaining to new releases or updates to the software product. Release notes pertain to specific versions of the software. Release notes may for example originate from the developers who worked on the code for the software release.

Another source of documentation is via customers 114 who report a problem in the software product 110. As shown in FIG. 1, a Customer Relationship Management (CRM) system 130 may be used by the vendor to communicate with customers. Once the problem has been addressed by customer support, a document is created detailing the problem reported, and solution. For example, in some instances, a problem will not require an update to the software, but instead a simple explanation of a solution.

In general, all product communication is recorded within the documentation system 122. Regardless of the type or source of the document, all documentation is thoroughly categorized according to a plurality of different criteria. As mentioned above, software product 110 has a plurality of different versions. Therefore, in one aspect, documentation is categorized based on the version of the software product to which it pertains.

For example, a software product version 4.3.0.1 may have a defect "X". Defect "X" is resolved with version 4.3.0.2, but re-introduced with an interim fix and later resolved in version 4.3.0.3. A customer installing software product version 4.3.0.3 does not need to see any notification of defect "X", or documentation related to a work around for defect "X". However any customer that is running 4.3.0.1 or the interim fix does need this documentation, if they are using the component affected.

Therefore, in one aspect, the documentation is entered into a version control system 126 and is categorized according to its applicability to version of software product. The version control system may be same or similar to those systems used for tracking source code of the software product itself.

In one aspect, documents are further categorized based upon a plurality of other criteria. For example, documents may be categorized based upon criteria relating to the installation environment of the software product. For example, one type of criteria includes the operating system (OS) on which the software product is installed. Many software products are developed for more than one operating system or platform, and therefore the documentation should be tailored according to the operating system. Furthermore, operating system vendors also continue to modify releases with patches and may introduce defects and change features that require special instructions from the product vendor. For example, a customer using operating systems such as the IBM AIX or Linux operating systems should be presented with documentation specific to the AIX or Linux operating system. The documentation does not need to include information specific to other operating systems such as the Microsoft Windows operating system. (IBM and AIX are registered trademarks of International Business Machines Corporation in the United States, other countries, or both. Linux is a registered trademark of Linus Torvalds in the United States, other countries, or both. Microsoft, Windows, Windows NT, Windows Server, Windows Vista, and the Windows logo are trademarks of Microsoft Corporation in the United States, other countries, or both.)

Other criteria relating to the installation environment include hardware, and applications associated with the installation environment.

In another aspect, the documentation may be further categorized according to the expected audience, or reader of the documentation. Multiple audiences are addressed in documentation, with the addition of topical level control for skill level or need to know. Some want just the facts, while others want to be presented with justification for the action required, impact and future solution. For example, an administrator of the software product may want technical information related to the installation and maintenance of the software product. However, the end user of a software product may not want as much technical detail, and may not even be concerned with issues such as installation.

Documentation could also be categorized according to level of detail. One level may include a brief summary, for those who do not enjoy a lengthy explanation. A second level may add more detail or explanation in case the short summary doesn't get the point across.

In yet another aspect, the documentation may be categorized by subject or topic. This may be similar to the topics found in a table of contents. This enables the readers of documentation to access the information they need quickly.

At some point in time, customer 114 may experience an issue with software product 110. Alternatively, the customer may simply want or need instructions for configuring or installing a specific aspect of the software product 110. In any case, the customer needs documentation which provides support for the software product.

The present disclosure provides a system and method for generating a customized support document for a software product, the customized support document being tailored at least to the installed version of the software product, and the installation environment of the software product. Therefore, as shown in FIG. 1, a customized documentation module 134 is provided as an interface between vendor and customer. The customized documentation module is configured to generate a custom document tailored to the specific version and configuration of the customer's installation environment. This is accomplished by detecting the version of the software product 110 installed in the installation environment 112, and by detecting a configuration of the installation environment 112. Documents, or subsets thereof, from the plurality of documents within the documentation system that match the version of the installed software product, and the configuration of the installation environment are selected. The documents, and/or subsets thereof are compiled together as a customized document and presented to the customer. The document may for example be compiled in Portable Document Format (PDF), in a web browser as Hypertext Markup Language (HTML), or any other specific documentation/help system format such as Eclipse Help.

Figure 2:
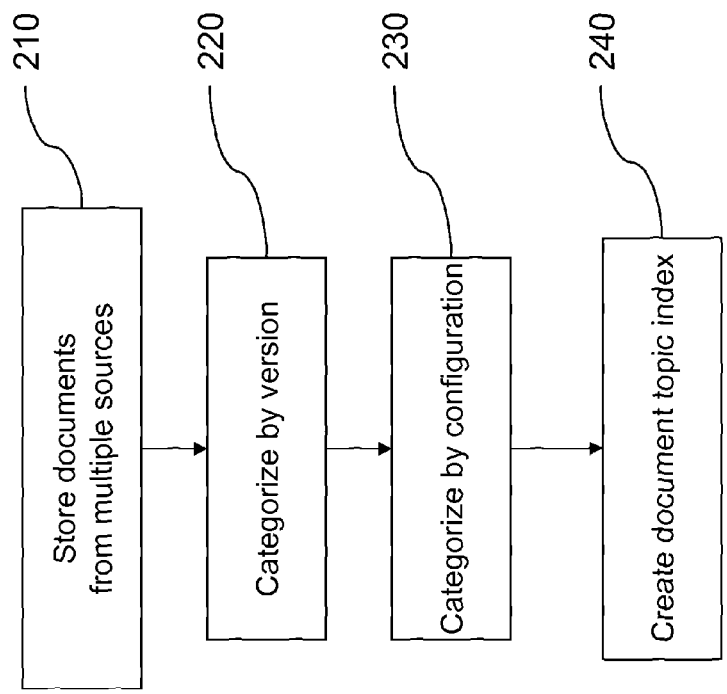
FIG. 2 is a flow diagram of a method for generating customized documentation in accordance with one aspect of the present disclosure.

FIG. 2 is a flow diagram illustrating the basic steps involved with creating and maintaining a documentation system in accordance with one aspect of the disclosure. As mentioned above, a plurality of documents pertaining to a software product are collected from a plurality of different sources, as indicated at block 210. In one aspect, each of the documents is categorized according to which version or versions of a plurality of versions of the software product to which the document corresponds. A single document may correspond to a single version of the software product. More than one document may correspond to a single version of the software product. Furthermore, a single document may correspond to one or more versions of the software product. Therefore, as indicated at block 220, each document is categorized according to the version of software product to which it corresponds.

The documents are further categorized according to other criteria, which are defined depending on the software product and vendor. Examples of other criteria include criteria relating to the installation environment of the software product, such as operating system, hardware, and applications present or associated with the installation environment. Documents are thereby categorized by configuration criteria, as indicated at block 230. Criteria may also include customer defined aspects such as audience and level of detail. In one aspect, a document index is also created, as indicated at block 240. The document index may be similar to a table of contents.

Figure 3:
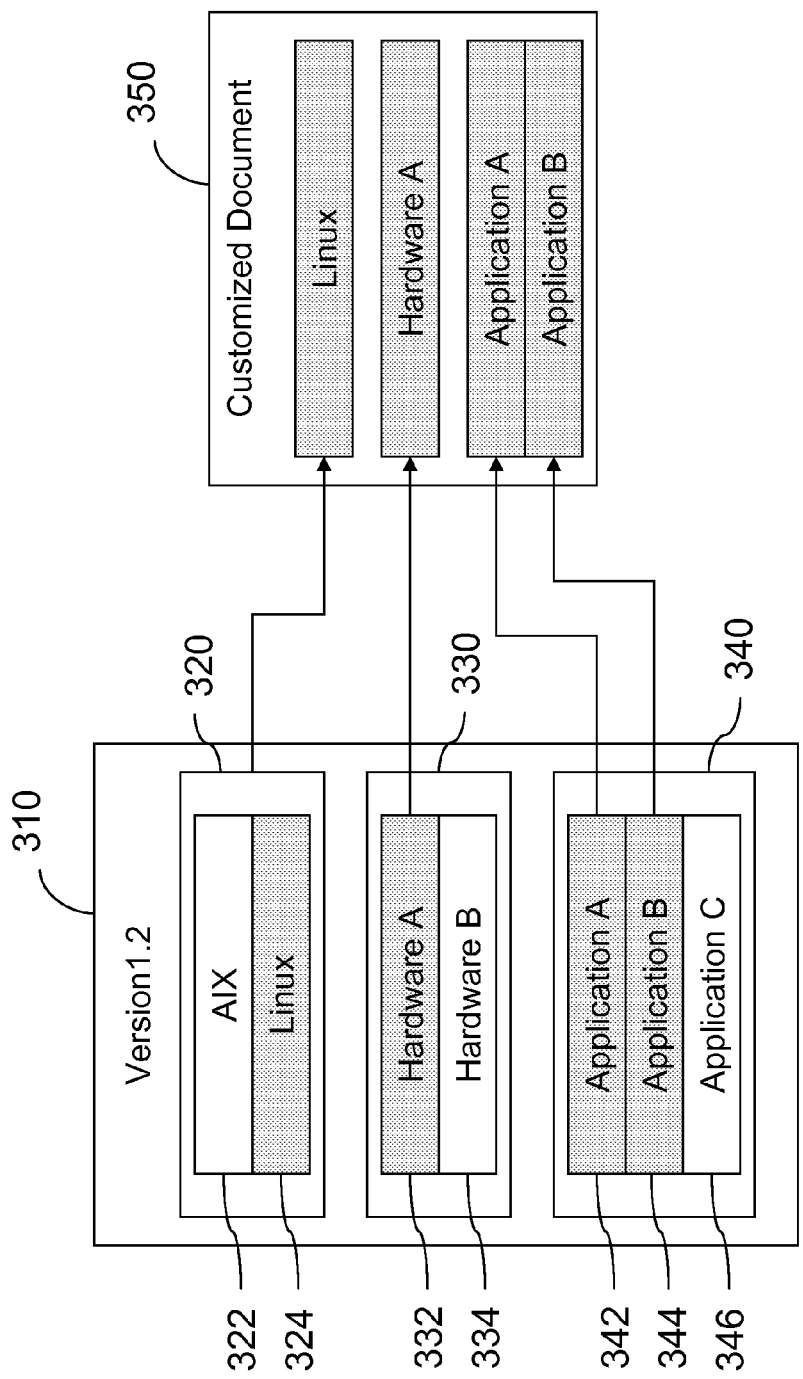
FIG. 3 shows an exemplary embodiment of creating a customized document in accordance with one aspect of the present disclosure.

The act of categorizing or classifying the documentation may be accomplished in many different ways. FIG. 3 illustrates one example of how a document may be structured, and thereby categorized in order to create a customized document in accordance with the present disclosure.

As mentioned above, a document may correspond to one or more versions of the software product. For example, some material may be relevant to more than one version of the software, and may not require being duplicated or revised in view of subsequent versions. Also, there may be more than one document that relates to each version of the software product.

In one aspect, a document is divided into a plurality of subsets. Each of the subsets corresponds to a certain criteria. For example, in the example shown in FIG. 3, a document 310 contains information corresponding to version 1.2 of the software product. In this example, the document 310 contains information which can be categorized according to three different criteria. A first criteria 320 includes the type of operating system on which the software program is installed. In the example shown, the software product can operate on an AIX operating system or a Linux operating system. Document 310 contains documentation information relevant to both the AIX and Linux operating systems. However, in this case, information pertaining to the AIX operating system is located in one subset 322 of the document, and information pertaining to the Linux operating system is contained within another subset 324. Only the subset relevant to the customer's installed operating system is selected to be included in the customized document.

A second criteria 330 includes specific hardware elements associated with the installation environment of the software product. For example, Hardware A and Hardware B are hardware elements that may be found to be associated with an installation environment of the software product. Perhaps there are known issues with the interaction between Hardware A and version 1.2 of the software product. This information would be beneficial to a customer using Hardware A, yet not relevant to those customers using Hardware B. As noted in FIG. 3, information pertaining to Hardware A is located within subset 332, while information pertaining to Hardware B is located within subset 334 of document 310.

A third criteria 340 includes one or more applications associated with the installation environment of the software product. Similar to the interaction with hardware elements, there may be known issues with other software products or applications of which a customer should be made aware. Therefore, information related to each specific application is divided into subsets as well (342, 344, 346).

In the example shown in FIG. 3, a customer having installed version 1.2 of a software product operating on Linux, with Hardware elements "A" installed, and Applications "A" and "B" present in the installation environment is detected. A customized document is generated based on this configuration. Therefore, subsets 324, 332, 342, and 344, which correspond to the above mentioned configuration are collected and compiled in a customized document 350.

In one aspect, a document is simply a file containing text. Each document may contain a plurality of portions or subsets. Each portion or subset of a document may pertain to any one of the above mentioned criteria. Subsets and criteria may be indicated by the use of tags within the document to indicate the start and end of a specific subset. A document may be a single file, or multiple files.

Of course, there are many other ways to structure the information. For example, a database could be used to index and categorize documentation. In this case, the term document may instead be defined as a database entry.

Figure 4:
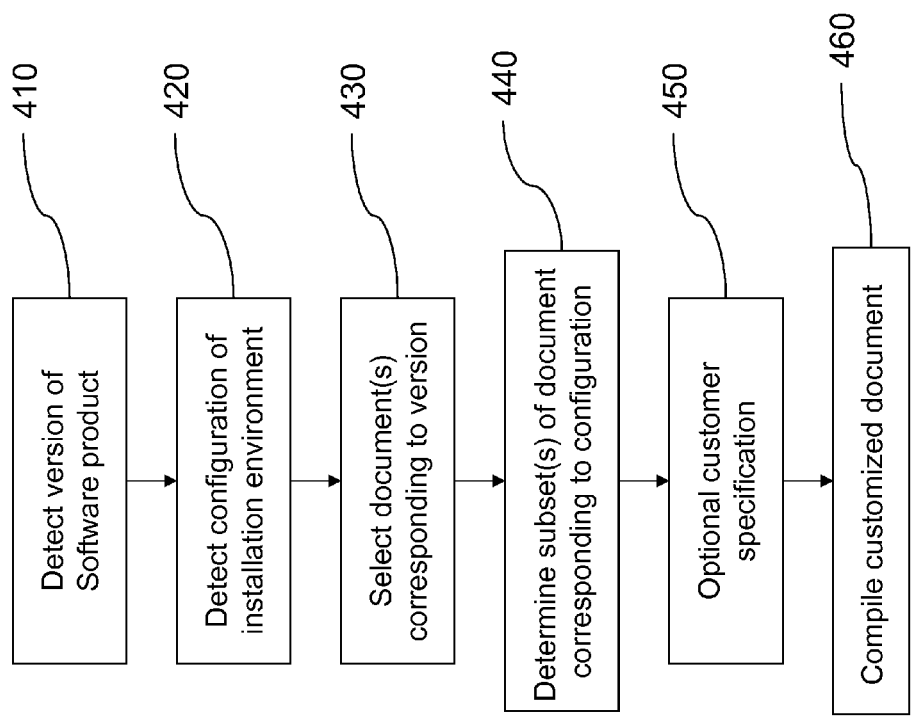
FIG. 4 is a flow diagram of a method for generating customized documentation in accordance with one aspect of the present disclosure.

FIG. 4 is a flow diagram of the basic steps involved in creating a customized document according to the configuration of the software product. As indicated at block 410, the version of the software product installed in an installation environment is detected. The configuration of the installation environment is also detected, as indicated at step 420.

In one aspect, a discovery application is provided to automatically detect the configuration of the software product within its installation environment. For example, a customer may be able to download a discovery application to his or her computer. The application is designed to analyze the configuration of the installation environment of the software product. For example, in one aspect the application is configured to automatically determine the version of the software product that is installed. In another aspect, the application also detects the configuration of the installation environment as defined by various criteria. For example, this criteria may include the operating system (and applicable version thereof) of the installation environment. In yet another aspect, the application analyzes the type(s) of hardware of the installation environment. This may for example include processor, video card, main board, memory, network card, etc. If the software product interacts with other software products, the discovery application may be configured to detect the presence of other software products with which it interacts.

In another aspect, the configuration may be detected through a manual selection by a user. For example a configuration could be chosen through a series of drop down menus. In one aspect, the configuration process produces a style list that is built from a bill of materials or options template.

Once the configuration of the software product and its installation environment has been provided, documents corresponding to the detected version of the software product are selected, as indicated at step 430. Next, documents, or subsets thereof, are selected which specifically correspond to the configuration of the installation environment, as indicated at step 440.

Depending on the structure of the document, this could involve a select statement from a database. Alternatively this could involve searching for tags within a document which specify the location of each subset of information.

As indicated by step 450, in one aspect, additional criteria may also be optionally specified by the customer. The customized document is compiled at step 450. In one aspect, a build process reads the configuration and compiles custom document(s) in PDF, HTML, and/or other formats.

In one aspect, the customized documentation may comprise the original software product manual as a base. In addition, however, all release notes specific to the version installed are added to the manual. They may be added at the end, or intermingled with the manual. Also, any defect reports relevant to the configuration may be added.

In one aspect, the customized document is made specific to the customer's defined environment and kept current using all reported problems. This may be accomplished by saving the detected configuration of the customer's software product, and monitoring for changes matching the configuration. As new problems are reported, a problem detail or notification is made if relevant to the current configuration.

Updates notices are received, and depending on configuration are either compiled in document per above compile step or notified with configured method similar to a software fix process. This is quite different because a software fix process often leaves many unused documentation files, and the fix process is very specific to the configuration.

In another aspect of the disclosure, a customer support system and method for responding to issues reported by a customer by identifying a potential defect in the software product documentation is disclosed. In other words, issues with a software product are addressed by treating the issue as a defect in the software product's documentation and updating the documentation accordingly.

Traditional customer support systems and methods tend to identify an issue or defect with a software product and work to address the issue or defect. However, once the issue has been addressed for the customer, the customer support process usually ends there. Often, the documentation is not updated to address the problem, and thereby, the documentation cannot prevent other customers from experiencing the same problem. Furthermore, even if the documentation is updated, there is no good way of providing other customers with such updates to the documentation. This is a significant problem in customer support. The same issue gets reported over and over by multiple customers, and can be quite time consuming. However, by using the product documentation as reference in communications and considering that every problem with a software product requires improvement in the software product's documentation, the cycle can be corrected.

Basic steps are as follows:

1. Customer Support process categorizes a customer problem or question and resolves. However, the problem is not just identified in the software product, but as a defect in the documentation.

2. Problem categorization process finds or creates and indexes a reference to existing document(s).

3. A resolution is recorded or updated in the document.

Figure 5:
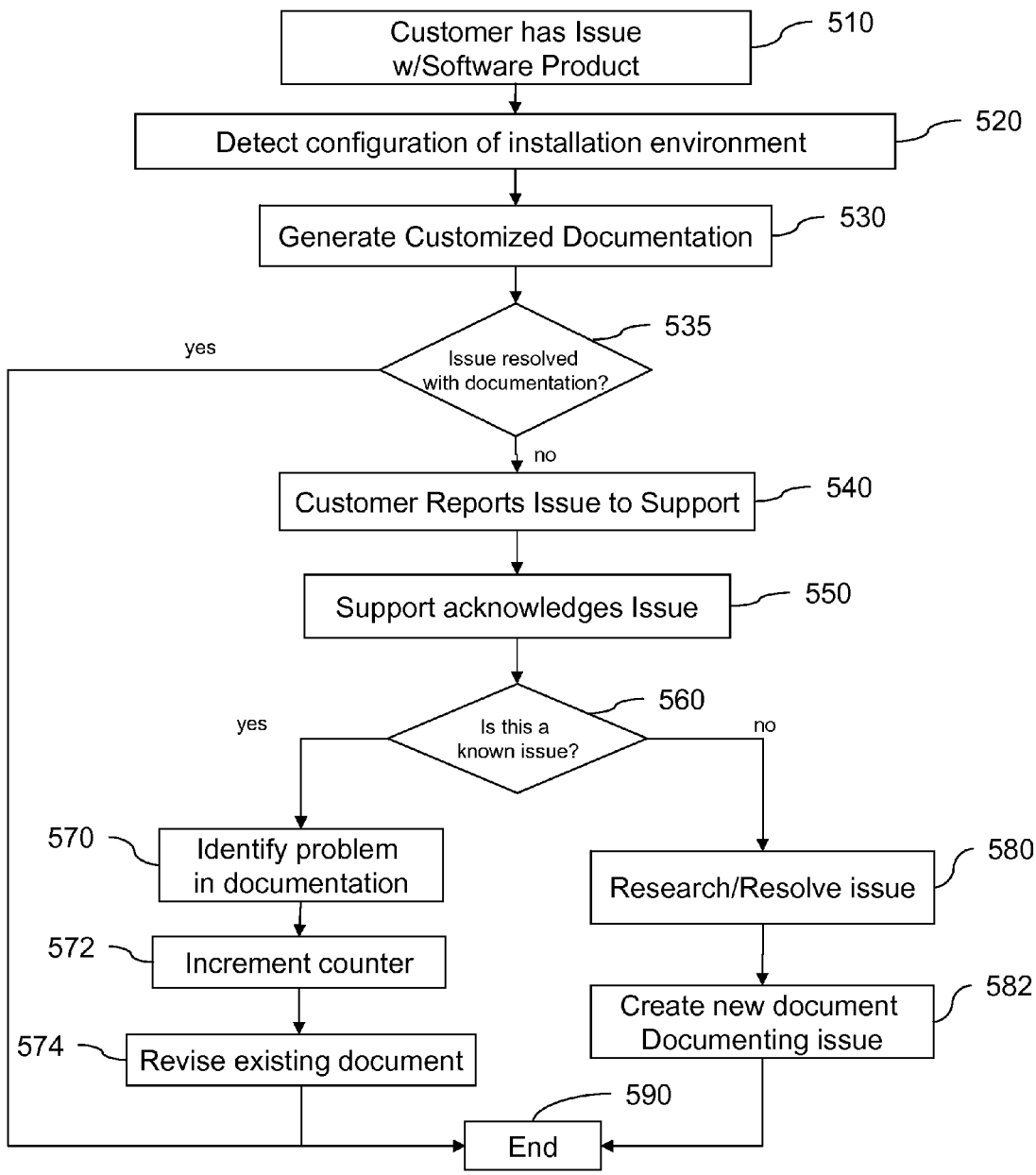
FIG. 5 is a flow diagram of a customer support method in accordance with one aspect of the present disclosure.

FIG. 5 illustrates one aspect of a customer support method in accordance with the present disclosure. Consider a customer has an issue with an installed software product, as is indicated at block 510. The customer may first be provided with the option of providing a customized set of documentation (as has been described thus far) before reporting the specific issue to customer support. As described above, the configuration of the customer's installation environment is detected, as indicated at block 520. This may either be accomplished through a discovery application configured to automatically detect the configuration of the software product and its installation environment, or through a manual process such as user selection through a plurality of menus. Based on the detected version of the software product and the configuration of installation environment, a customized set of documentation is generated, as indicated at block 530. The customized set of documentation is specific to the detected version of the software product as installed, and is further specific to the detected configuration of the installation environment (operating system, hardware, etc) The documentation may further optionally be tailored to user selected criteria such as a specific topic, level of detail, audience, etc.

As indicated by decision block 535, the issue may or may not be resolved through the generation of customized support documentation. In an ideal situation, the issue, as well as a detailed solution, is described within the customized document, and the customer support inquiry ends at block 590. However, if the customer is not provided with an adequate solution to their issue, the issue must still be addressed by customer support. Therefore, if the issue is not adequately addressed for the customer in the customized documentation, the issue is reported to customer support for further investigation at step 540.

It should be understood that several of these steps may occur in different orders. For example in another aspect, the customer reports the issue to customer support (block 540)

first, and the customized documentation is generated (block 530) after submitting the issue to customer support.

At decision block 555, customer support determines whether or not the issue reported by the customer is a known issue.

For example, the issue may have previously been reported by another customer, and is in the process of being resolved. Or in another example, there simply may be no discussion of the issue within the documentation. In another aspect, the issue may be discussed in the documentation, however the solution is not a good or proper explanation. Another problem might arise in difficulty in finding the information with the documentation. The proper solution may be present in the documentation, but not located in the right place such that a customer can locate the information easily.

Regardless, if the issue is a known issue, customer support attempts to identify a portion of the documentation to which the issue should correspond.

In one aspect, a counter is incremented each time a known issue is reported. The counter would identify a portion of the documentation.

Therefore, customer support could monitor the number of times an issue has arisen in a specific area of documentation, and could thereby make the decision that appropriate measures should be taken to revise that area of the documentation.

If it is determined that the document does not adequately address the issue, the document is revised, as indicated at step 584.

At decision block 555, customer support determines whether or not the issue reported by the customer is a known issue.

For example, the issue may have previously been reported by another customer, and is in the process of being resolved. Or in another example, there simply may be no discussion of the issue within the documentation. In another aspect, the issue may be discussed in the documentation, however the solution is not a good or proper explanation. Another problem might arise in difficulty in finding the information with the documentation. The proper solution may be present in the documentation, but not located in the right place such that a customer can locate the information easily.

Regardless, if the issue is a known issue, customer support attempts to identify a portion of the documentation to which the issue should correspond.

In one aspect, a counter is incremented each time a known issue is reported. The counter would identify a portion of the documentation.

Therefore, customer support could monitor the number of times an issue has arisen in a specific area of documentation, and could thereby make the decision that appropriate measures should be taken to revise that area of the documentation.

If it is determined that the document does not adequately address the issue, the document is revised, as indicated at step 584.

If at decision block 555, the issue is determined to be a new or unknown issue, customer support first works to research and resolve the issue, as indicated at block 580. Once the issue has been addressed for the customer, either with a work around, or a fix to the software product, the issue is then addressed in the documentation. Because this issue is new or unknown, it is likely there is no mention of the issue within the documentation. The documentation is therefore revised accordingly, whether that involves updating an existing document to include new information, or creating a new document pertaining to the issue reported by the customer.

The documentation system therefore provides a single source of information that is appropriate for the customer by generating a customized document that is specific to the customer's environment. The environment can be either defined or discovered with an automated application. The documentation system also solves costly multiple customer support problem reports for the same defect by providing solutions to defects in documentation. Further, the documentation system provides a method of automation or user configuration selection, the customer environment is stored so that out of scope information is minimized. Customer specific easy to follow documentation is provided by the addition of customer specific configuration. In addition, the documentation system provides a process and structure to provide up to the minute customer implementation specific documentation. The documentation system avoids broadcasting, to the market, the number and type of defects with large number of technotes. Further, the documentation system solves customer's problem or answers the question before a problem management report is opened in the customer relationship management system. In addition, the documentation system provides an approach which allows customer support to solve a problem once. The documentation system also documents the defects and work arounds that the customer needs with updates to remove old work arounds.

The documentation system provides a process for product documentation when product life cycle changes. When product documentation is released and is planned to be removed from marketing, the ownership of the publications are moved to the Support Organization or a new role within Information Development that allows frequent quick turn changes to be dictated from support and released on demand. Further, the documentation system enables the end user to customize the product documentation and allow for dynamic updates. In addition, the documentation system allows support to correct documentation defects and enhancements before problem closure, or an index to where the problem closure was documented is recorded.

Customer problem closure is utilized by documentation index key references to the document where the problem summary is documented. Resolution or work around may have different life cycle and when available are found using this same index key. Use of an index key enables clear documentation of the problem, provides environment and configuration, and allows extensions so it can be added to existing electronic collections and submission tools.

Customer configuration information enables detail usage feedback so that contemplated changes may be recorded for better risk assessments, migration proposals, and product planning. In general, problem hotspots can quickly be located, analyzed, and corrected.

Figure 6:
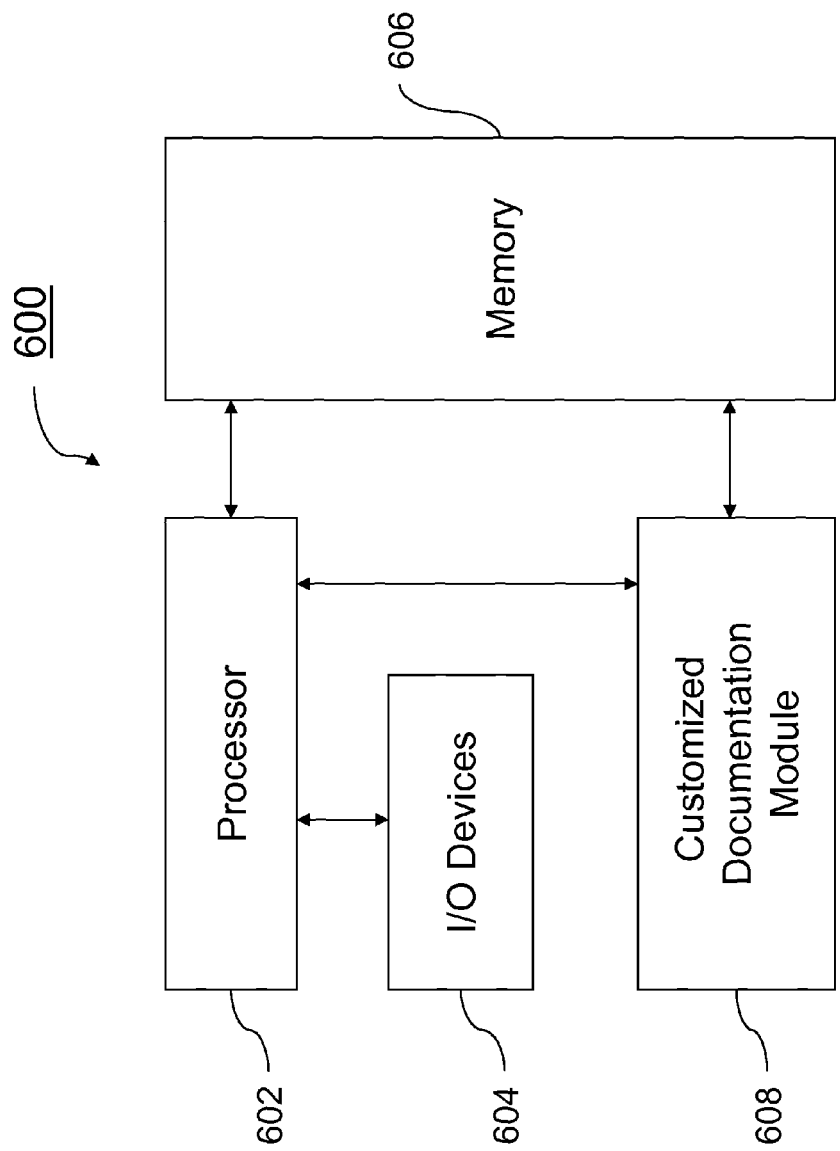
FIG. 6 is a block diagram of a system that utilizes customized documentation as implemented in hardware.

FIG. 6 illustrates a block diagram of a system 600 that generates customized documentation for a user's specific software product configuration. In one embodiment, the system 600 is suitable for storing and/or executing program code and is implemented using a general purpose computer or any other hardware equivalents. Thus, the system 600 comprises a processor 602, a memory 606, e.g., random access memory ("RAM") and/or read only memory ("ROM"), a component recycling module 608, and various I/O devices 604.

The processor 602 is coupled, either directly or indirectly, to the memory 606 through a system bus. The memory 606 can include local memory employed during actual execution of the program code, bulk storage, and/or cache memories which provide temporary storage of at least some program code in order to reduce the number of times code must be retrieved from bulk storage during execution.

The I/O devices 604 can be coupled directly to the system 600 or through intervening input/output controllers. Further, the I/O devices 604 can include a keyboard, a keypad, a mouse, a microphone for capturing speech commands, a pointing device, and other user input devices that will be recognized by one of ordinary skill in the art. Further, the I/O devices 604 can include a receiver, transmitter, speaker, display, image capture sensor, biometric sensor, etc. In addition, the I/O devices 604 can include storage devices such as a tape drive, floppy drive, hard disk drive, compact disk ("CD") drive, etc.

Network adapters may also be coupled to the system 600 to enable the system 600 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include, but is not limited to, firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer program product comprising a computer useable storage medium having a computer readable program, wherein the computer readable program when executed on a computer causes the computer to:
    detect which one of a plurality of versions of a software product is installed in an installation environment;
    detect a configuration of the installation environment;
    select a document from one or more documents that corresponds to the version of the software product installed in the installation environment;
    determine a subset of the selected document that includes the version of the software product installed in the installation environment and the configuration of the installation environment;
    compose a customized document based on the subset of the selected document, wherein the customized document is composed in response to a report by a customer of an issue with the software product;
    identify a potential deficiency in the customized document if the issue reported by the customer is not addressed by the customized document;
    identify a corresponding deficiency in the subset of the selected document from which the customized document was composed;
    revise the selected document to address the issue with the software product; and
    save the configuration and automatically update the customized document based on the saved configuration.

2. The computer program product of claim 1 wherein the one or more documents include support documentation on the software product.

3. The computer program product of claim 1 wherein the configuration is detected automatically by a discovery application.

4. The computer program product of claim 1 wherein the configuration is detected automatically by receiving a selection from a user through one or more selection menus.

5. The computer program product of claim 1 wherein the configuration of the installation environment includes an operating system associated with the installation environment.

6. The computer program product of claim 1 wherein the configuration of the installation environment includes a listing of one or more hardware devices associated with the installation environment.

7. The computer program product of claim 1 wherein the configuration includes a listing of one or more applications associated within the installation environment.

8. The computer program product of claim 1 wherein the one or more documents are stored in a version control system.

9. The computer program product of claim 1 wherein a determination is made that there is a deficiency in the customized document by monitoring a counter, the counter increased for each subsequent report of the same issue.

10. A method comprising:
    detecting which one of a plurality of versions of a software product is installed in an installation environment;
    detecting a configuration of the installation environment;
    selecting a document from one or more documents that corresponds to the version of the software product installed in the installation environment;
    determining a subset of the selected document that includes the version of the software product installed in the installation environment and the configuration of the installation environment;
    composing a customized document based on the subset of the selected document wherein the customized document is composed in response to a report by a customer of an issue with the software product;
    identifying a potential deficiency in the customized document if the issue reported by the customer is not addressed by the customized document;
    identifying a corresponding deficiency in the subset of the selected document from which the customized document was composed;
    revising the selected document to address the issue with the software product; and
    saving the configuration and automatically updating the customized document based on the saved configuration.

11. The method of claim 10 wherein the one or more documents include support documentation on the software product.

12. The method of claim 10 wherein detecting the configuration is performed automatically by a discovery application.

13. The method of claim 10 wherein detecting the configuration is performed by receiving a selection from a user through one or more selection menus.

14. The method of claim 10 wherein the configuration of the installation environment includes an operating system associated with the installation environment.

15. The method of claim 10 wherein the configuration of the installation environment includes a listing of one or more hardware devices associated with the installation environment.

16. The method of claim 10 wherein the configuration includes a listing of one or more applications associated within the installation environment.

17. The method of claim 10 wherein the one or more documents are stored in a version control system.

18. The method of claim 10 wherein a determination is made that there is a deficiency in the customized document by monitoring a counter, the counter having been increased for each subsequent report of the same issue.

19. A system comprising:
- a document repository configured to store a plurality of documents, each document corresponding to one of a plurality of versions of a software product;
- a discovery application configured to detect which one of the plurality of versions of the software product is installed in an installation environment and a configuration of the installation environment;
- a document selection module configured to select a document from the one or more documents that corresponds to the version of the software product installed in the installation environment and further selecting one or more subsets of the selected document that corresponds to the configuration of the installation environment;
- a document generation module configured to compose a customized document based on the one or more subsets of the selected document, wherein the customized document is composed in response to a report by a customer of an issue with the software product;
- a customer support module configured to identify a potential deficiency in the selected document if the issue reported by the customer is not addressed by the customized document and to further revise the selected document to address the issue with the software product; and
- wherein the configuration is saved and the customized document is automatically updated based on the saved configuration.

20. The system of claim 19 wherein the document selection module comprises a database engine.

21. The system of claim 19 wherein the plurality of documents include support documentation for the software product.

22. The system of claim 19 wherein the configuration of the installation environment includes an operating system associated with the installation environment.

23. The system of claim 19 wherein the configuration of the installation environment includes a listing of one or more hardware devices associated with the installation environment.

24. The system of claim 19 wherein the configuration includes a listing of one or more applications associated within the installation environment.

25. The system of claim 19 wherein the one or more documents are stored in a version control system.

26. The system of claim 19 wherein the customer support module further is configured to increment a counter with each subsequent report of the same issue and a determination is made that there is a deficiency in the customized document if the counter reaches a predetermined limit.

* * * * *